Aug. 18, 1959     E. P. BROGLIO     2,900,432
BATTERY CASING
Filed Aug. 30, 1955
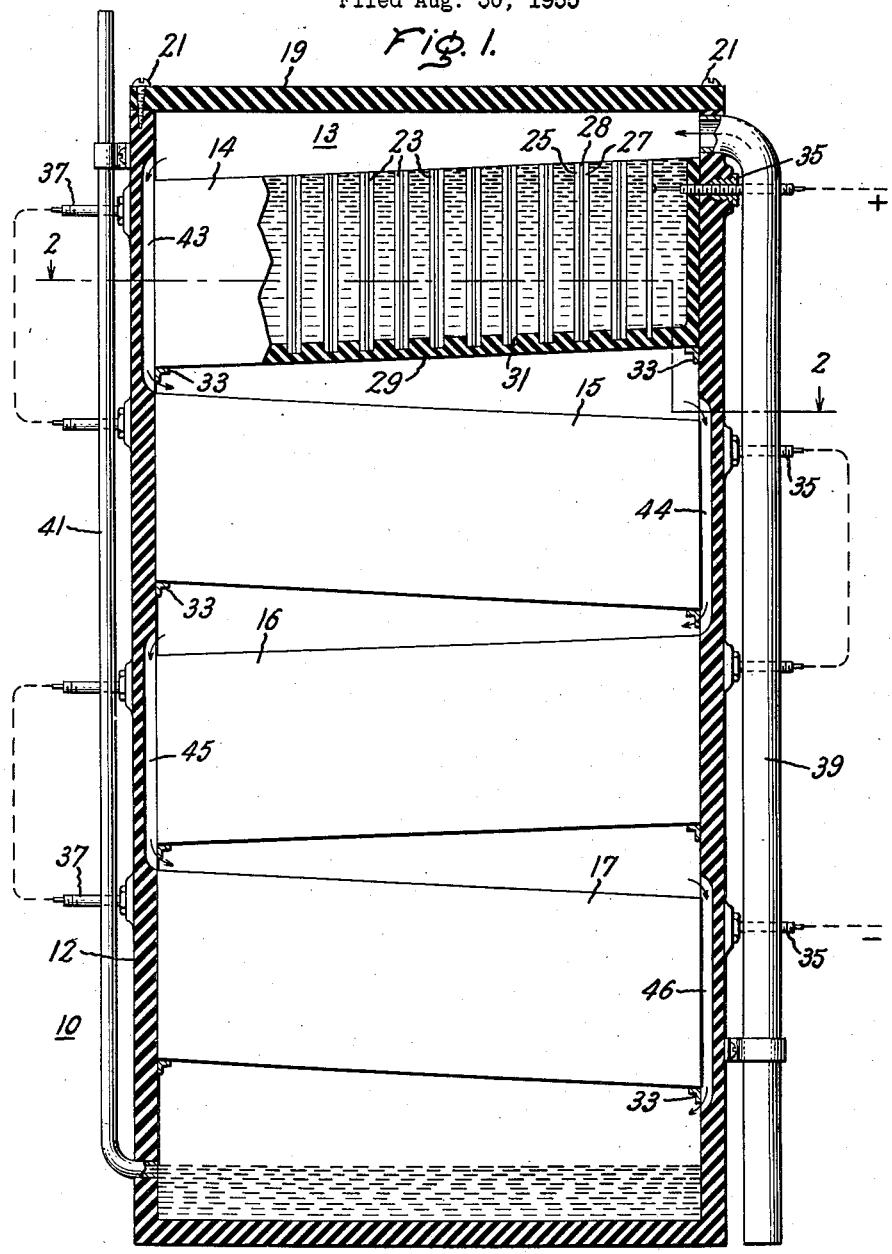
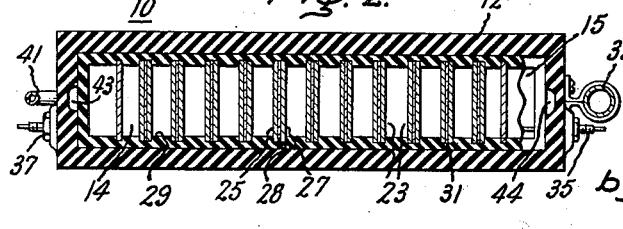
Inventor:
Edward P. Broglio,
by *[signature]*
His Attorney.

United States Patent Office 2,900,432
Patented Aug. 18, 1959

2,900,432

BATTERY CASING

Edward P. Broglio, Jasper, Mo., assignor to General Electric Company, a corporation of New York Application August 30, 1955, Serial No. 531,417

10 Claims. (Cl. 136—90)

This invention relates to electric batteries and more particularly to battery and battery case construction in deferred action batteries adapted to be stored dry and to be activated at time of use by immersion in water.

The conventional deferred action battery normally is of primary or "one-shot" type and comprises a plurality of electrode units arranged in a casing in mutually spaced relation, the casing being provided with means for admitting water to serve as an electrolyte or as the liquid vehicle for a dry electrolyte previously placed in the battery. Each electrode unit usually comprises a positive and a negative plate mounted in back-to-back relation with electrical connection between the positive plate of one electrode unit and negative plate of the next adjacent unit being provided by the body of electrolyte between them. Lead wires then are brought out from the two end plates of the series. In some constructions of this type, the spaces between adjacent electrode units are occupied by separators fabricated of a bibulous material, the separators being impregnated with a salt capable of dissolving in water to form a suitable electrolyte therewith if the battery is to be used in fresh water. Batteries of this type normally are stored dry and at time of use are dunked or submerged in water for activation.

Because of their light weight, high wattage output and long shelf life when stored dry, batteries of the general type described present many advantages for use in applications wherein these attributes are particularly desirable, for example in torpedo propulsion and for powering marker buoys and emergency radio transmitters.

As heretofore constructed, however, they have also been subject to a number of disadvantages seriously detracting from desirability of their use, particularly where relatively high output voltages are required. High voltage batteries require fluid isolation between the individual battery cells, since the electrolyte necessarily is an electrical conductor and therefore may short circuit any cells between which it provides a continuous path, thus permitting excessively high leakage current flows between battery cells with consequent deleterious effect on battery life and power output. This necessary isolation of the individual battery cells has in prior battery constructions been obtained in several ways, each of which presents its own disadvantages.

One known system for minimizing short circuiting in batteries of this type utilizes bibulous separators between the electrode units and incorporates means for admitting water into the casing only momentarily and in quantity just sufficient to moisten the separators, the water then being expelled from the casing usually by gas pressure generated either by the battery reaction or by a separate gas generator mounted in the battery casing. Such quantity of water as is absorbed by and retained in the separators then is relied on to serve as the electrolyte. Aside from the general unreliability of the means relied on for controlling admission of water and expelling the same after wetting the separators, this construction is unsatisfactory because it provides for retention only of a limited and variable amount of electrolyte often inadequate to provide satisfactorily long service life. Also, the separators used may create polarization problems, and they tend to raise the internal resistance of the battery and may cause overheating and short-circuiting of the electrode units between which they are disposed.

In another proposed construction, the electrolyte is permitted to bridge all cells of the battery, and leakage current between cells is attempted to be minimized by special choice of electrolytes. Since the electrolyte must of necessity be electrically conducting, however, some short-circuiting between cells is inherent in these systems.

It is accordingly a primary object of the invention to provide electric batteries of deferred action type adapted to be activated by water immersion and including automatically operating means effective on immersion of the battery to control admission of water to the battery casing in a manner to minimize short circuiting between battery cells and to provide a water supply adequate to satisfy electrolyte requirements throughout the useful service life of the battery.

It is also an important object of the invention in an electric battery construction adapted to be activated by water immersion to provide means for admitting water into the battery casing in a manner to fill all of the battery cells and then close off further admission of water into the casing automatically in response to overflow from one or more of the cells.

Another object of the invention is the provision of a casing construction for deferred action batteries having a plurality of battery cells arranged in vertical stacked relation and including means operative to control admission of water into the casing in a manner to substantially completely fill each of the battery cells sequentially from top to bottom of the casing and then to cut off further admission of water into the casing.

Still another object is the provision in a casing construction for deferred action batteries, wherein the casing defines a closed chamber within which is disposed an upwardly open battery cell jar, of means for admitting water into the chamber and into the battery jar therein for filling the same, and for limiting further admission of water into the casing in response to overflow of water from the filled jar.

In carrying out the invention in one form, one or more upwardly open battery jars containing series-connected electrodes are disposed within a closed casing provided with a downwardly extending water inlet conduit opening into its upper end and an upwardly extending air exhaust conduit opening into its lower end. Water admitted through the inlet pipe on immersion of the battery flows into and fills the battery jar and, when the jar has been completely filled, the overflow therefrom passes into the bottom of the casing and accumulates there until it reaches a level with the air exhaust conduit opening into the casing. When the overflow water reaches this level, it closes off the air exhaust conduit and prevents further escape of air from the casing through the exhaust conduit. The pressure of the remaining air within the casing limits further admission of water through the inlet pipe, so that the entering water is cut off when the casing contains just enough water to fill its battery jar plus some excess which is below and completely out of contact with the battery jar.

The battery casing may if desired contain a plurality of battery jars arranged in vertical stacked relation with each tilted slightly with respect to the horizontal, means being provided for ducting overflow from the downwardly tilted end of each of the jars to the upwardly tilted end of the next lower jar and from the lowermost such jar to the bottom of the battery casing. The series filling of the battery jars which is thus effected makes it possible to activate a large, high-voltage battery, comprising many cells, with but one water admission control mechanism.

My invention itself will be more fully understood and its various objects, features and advantages will become more fully apparent by reference to the appended claims and the following detailed description when read in conjunction with the accompanying drawings, wherein:

Figure 1 is a longitudinal vertical section through one form of high voltage deferred-action battery embodying the invention; and Figure 2 is a sectional view to reduced scale taken substantially on the line 2—2 in Figure 1.

With continued reference to the drawings, wherein like reference numerals have been throughout to designate like elements, Figure 1 illustrates a presently preferred embodiment of deferred action battery construction embodying casing structure and water admission control means in accordance with the invention, the battery being designated generally by reference numeral 10 in Figure 1.

As shown, battery 10 comprises a casing 12 defining a closed chamber 13 within which is disposed a plurality of battery cells 14—17 arranged in vertical stacked relation from top to bottom of the casing. Casing 12 may be fabricated of any suitable material such as a corrosion-resistant metal, hard rubber or Bakelite, and may be provided with a removable side or top wall as indicated at 19 for insertion or removal of the battery cells. The removable wall may be fixed to the main body of the housing by any suitable means such as the screws 21 shown.

The battery cells 14—17 are shown as of pile type with electrical connection being made directly through the electrode units 23 and the electrolyte between them, thus obviating the need for individual jars for each electrode pair and external electrical connections between electrodes. The electrode units 23 each comprise a positive plate 25 and a negative plate 27, the two plates preferably being separated by an interposed barrier sheet 28 of an electrically conductive material which is impervious to the electrolyte and substantially inert to the battery reaction. The electrode plates may be of any of a number of known materials, the only requirement being that the materials of the two plates be compatible with each other and with the particular electrolyte to be utilized. For example, if the electrolyte is to be sea water, preferred electrode plate materials are silver chloride or copper chloride for the positive plate and magnesium for the negative plate, the barrier sheet for both these electrode combinations preferably being of silver foil.

The electrode units 23 are mounted within a container or jar 29 in crosswise relation thereof, which container should be fabricated of insulating material so as to insulate electrically each electrode unit from the others. Preferably, the jar 29 is made of a pliant and compressible material such as rubber of a soft plastic and has a series of inwardly opening grooves 31 cut in both sides and the bottom thereof, of width such that the grooves snugly receive the peripheral edges of electrode units 23. After an electrode unit has been inserted in each of the grooves 31, the cell jar is mounted in the battery casing 12 and may be held properly positioned therein by any suitable support means such as the bracket members 33 illustrated. Each jar 29 preferably is slightly longer than the width of casing 12 prior to assembly of the jar into the casing, so that during the assembly operation the material of the jar will be at least slightly compressed along an axis normal to its grooves 31. This compression of jar 29 is effective to squeeze the sides of its grooves 31 against the inserted edges of electrode units 23 to provide a liquid-tight seal therewith. The material of jar 29 thus is self-gasketing, in effect, and serves to positively isolate the body of electrolyte between each pair of electrode units from the electrolyte between other units, thereby preventing electrolyte from providing electrical continuity between any but the two adjoining electrodes.

As shown, each electrode unit 23 preferably is of a height just equal to the height of the jar 29 in which it is mounted, in order to prevent the existence of a continuous layer of liquid above the tops of the several electrode units within each jar. The battery jars 29 furthermore are tipped or inclined longitudinally with respect to the horizontal, each oppositely to the ones next adjacent it. This arrangement is of advantage for the reason that the difference in water levels thus provided on the sides of each electrode unit 23 minimizes the possibility of a continuous film of water remaining across the top of the electrode unit. This increases the effective width of the barrier between the positive and negative plates of each electrode unit and thus reduces back action between the two plates.

Except to the end electrodes, no external electrical connection to the electrode units is necessary, electrical connection between adjacent plates being provided by the intervening electrolyte. Electrical connections may be made to the end electrodes of each cell in any conventional manner and using conventional insulated fittings such as schematically illustrated at 35 and 37. It is to be understood that the several battery cells 14—17 may, if desired, be connected in parallel rather than in series as shown, and also that if preferred the inter-cell leads may be enclosed within the battery casing and only the end leads brought out.

The battery structure just described normally is manufactured, shipped and stored dry, no liquid electrolyte being added until such time as the battery is to be placed in actual service. As explained above, if the water in which the battery is to be used is salt water, the salt water will itself constitute a satisfactory electrolyte. If the battery is to be used in fresh water, a dry salt capable of dissolving in water to form electrolyte may be added to the battery during its manufacture, such dry electrolyte being placed between electrode units in each of the battery cell banks either in powder or like form or, if desired, as an impregnant in water pervious separators placed between the electrode units, the latter system being preferable because it assures a more uniform concentration of electrolyte when the battery subsequently is filled with water.

As noted, it is desired to control admission of water into the battery casing 12, on immersion thereof, in a manner to fill all the battery cell jars and then to cut off any further admission of water which might short-circuit the battery plates by providing not only the desired water path between adjacent plates but also continuous water paths to other plates in the cell. In accordance with the invention, operation in this desired manner is assured by provision of water inlet means which initially freely admit liquid into casing 12 and into the battery jars 29, and outlet control means which are responsive to water overflow from the jars to limit further admission of liquid by the inlet means. In the illustrated embodiment, these water admission control means take the form of a downwardly extending water inlet pipe or conduit 39 opening into casing 12 adjacent the top thereof so as to discharge entering water either above or directly into the higher right-hand end of the uppermost battery jar 29. An air exhaust conduit 41 opens into casing 12 adjacent the bottom thereof, beneath the lowermost cell 17, and extends upwardly alongside the casing 12 at least to a level above the upper end of the water inlet pipe 39 and as shown above the top cover 21. Ducts 43—46, which may be integrally formed in casing 12 as shown, are provided for the purpose of ducting overflow from the lowermost end of each of the battery jars 29 to the higher end of the next lower jar, and from the lowermost jar to the bottom of the casing. As noted above, each of the battery jars 29 preferably is tipped with respect to the horizontal, each oppositely to the jar next adjacent it, as this facilitates passage of overflow water from each jar to the one next beneath it.

When a battery having the structure just described is submerged in water to a level with the top cover 21, the water will enter inlet conduit 39 and displace air from within the battery casing 12, the air escaping outwardly through air exhaust conduit 41. The incoming water will flow first into the jar of the uppermost battery cell 14 and will fill the spaces between electrode units in this jar sequentially from right to left (Fig. 1). When all such spaces in the uppermost jar have been filled, overflow water will pass through conduit 43 to the next lower cell 15 and there fill its jar in similar manner, and so on down through the battery until all cells have been filled.

Overflow water from the lowermost cell 17 passes through duct 46 and into the bottom of casing 12, where it accumulates and eventually builds up to a level such that it closes off the end of air exhaust conduit 41. When this occurs, further escape of air from casing 12 is prevented and, since air can no longer be displaced from the casing, no additional water then can enter the casing except by compression of the air remaining trapped therein. This entrapped air will be compressed to a pressure just equal to the water pressure outside the casing, which will vary with the depth to which the casing is lowered. While some additional water may enter the casing as the air is compressed, thus raising the water level in the bottom of the casing to a level above the lower end of air exhaust conduit 41, the amount of water which may enter the casing in this manner is definitely limited. By properly dimensioning the various parts of the battery and casing it is readily possible to assure that, at normal service depths, the maximum water level within the casing remains somewhere below the lowermost battery cell 17. The water in the bottom of the battery casing then can cause no short circuiting problem.

The lengths of the water inlet and air exhaust conduits are important to successful operation of the battery. For satisfactory operation, the length of the water inlet pipe 39 should be such that the pipe extends downwardly to a point below the lower end of the air exhaust pipe 41, and the air exhaust conduit 41 should extend upwardly at least to and slightly beyond the upper end of the water inlet pipe.

At time of use, the battery casing preferably is first submerged to a level such that while the upper end of the water inlet pipe is below water, the upper end of the air exhaust conduit still is above the water surface. In the particular arrangement illustrated, for example, during the filling operation the battery normally is submerged about to a level with the top cover 21 of the battery casing. After the battery casing has filled, it then may be further lowered to any desired operating depth. Entrance of water through the submerged open end of air exhaust conduit 41 is prevented by reason of the fact that the lower end of water inlet pipe 39 is below the level of the body of water in the bottom of the battery casing; hence, no air can be forced outwardly through the water inlet pipe by water entering through the air exhaust conduit. Gases generated by the battery reaction may, however, escape through the water inlet pipe.

Lowering the battery to operating depth in the two-step manner just described positively prevents flow of water into the battery casing through the air exhaust conduit both during the filling operation and thereafter. It is not essential that this sequence of steps be followed, however, and if desired the battery may be dropped directly to operating depth. When this is done the outward flow of air through the air exhaust conduit, caused by inward flow of water through the water inlet pipe, minimizes any flow of water into the casing through the air exhaust conduit. Such flow may be further minimized by making the air exhaust conduit of relatively small diameter as compared to the water inlet pipe, as shown in Figure 2.

If desired, the air exhaust conduit may be made sufficiently long to extend upwardly to the surface of the water when the battery casing has been submerged to its operating depth. If this is done, then the only requirement as to water inlet pipe length is that it extend downwardly sufficiently far to prevent simultaneous in-flow of water and out-flow of air through the pipe. This requires only that the inlet pipe have a downwardly directed right angle bend leading from the point where the pipe opens into the battery casing, the pipe being terminated immediately below this bend.

As will be apparent from the foregoing, the battery casing construction and water admission control system of the invention provide positive protection against court circuiting of the battery cells and at the same time assure an adequate supply of electrolyte in quantity sufficient to fully satisfy the requirements of the battery throughout its useful service life. Absolute reliability of operation is assured by the complete absence of valves and other moving parts, and the structural simplicity of the device and its ability to sequentially fill a plurality of battery jars with but one water admission control mechanism makes possible the production of plural cell, high-voltage batteries at low unit cost.

While one specific embodiment of this invention has been shown and described, it will be understood that various modifications may be made without departing from the invention. The appended claims are therefore intended to cover all such modifications as fall within the true spirit and scope of the invention.

What I claim as new and desire to secure by Letters Patent of the United States is:

1. In a deferred action battery, a casing construction comprising wall means defining a closed chamber and further defining a battery jar within said chamber, inlet means operable when said casing is immersed to admit liquid into said chamber and into said jar for filling the jar, and air exhaust means responsive to overflow from said jar to limit further inflow of liquid through said inlet means into said chamber.

2. In a deferred action battery, a casing construction comprising wall means defining a closed chamber and further defining a battery jar within said chamber, a downwardly directed water inlet conduit extending through said wall means and opening into said closed chamber adjacent the upper end thereof and arranged to discharge entering water into said battery jar, and an upwardly directed air outlet conduit extending through said wall means and opening into said chamber adjacent the bottom thereof whereby on immersion of said casing in water, water may enter the casing through said water inlet means and displace air from the casing through said air outlet means until overflow water from said jar rises to a level in the bottom of said chamber such that the water closes off said air outlet means and thereby limits further admission of water into said chamber by said inlet means.

3. A multi-cell battery casing construction comprising wall means defining a chamber and further defining a plurality of battery jars disposed within said chamber and arranged one above the other, a plurality of substantially vertically disposed battery electrode members arranged in horizontally spaced relation in each said battery jar, said jars being tipped with respect to the horizontal each oppositely to the jar next adjacent it in a manner to vertically stagger the upper edges of adjacent battery electrode members in each said jar, inlet means for admitting liquid into said chamber and into the uppermost of said jars adjacent the higher end thereof for filling the jar at least to a level with its lower end, and means ducting overflow liquid from the lower end of each of said jars to the higher end of the next lower jar whereby said battery jars are filled sequentially from top to bottom of the casing.

4. In a deferred action battery, a casing construction comprising wall means defining a closed chamber and further defining a plurality of battery jars enclosed within said chamber and arranged one above the other, inlet means for admitting liquid into said chamber and into the uppermost of said jars for filling the jars, means ducting overflow liquid from each of said jars to the next lower jar and from the lowermost of said jars to the bottom of said closed chamber, and air exhaust means responsive to the presence of overflow liquid in the bottom of said chamber to limit further inflow of liquid through said inlet means into said chamber.

5. In a multi-cell battery, a casing construction comprising wall means defining a closed chamber and further defining a plurality of battery jars enclosed within said chamber and arranged one above the other with said jars being tipped with respect to the horizontal each oppositely to the jar next adjacent it, inlet means for admitting liquid into said chamber and into the uppermost of said jars adjacent the higher end thereof for filling the jar at least to a level with its lower end, means ducting overflow from the lower end of each of said jars to the upper end of the next lower jar, air outlet means for venting air from said closed chamber on admission of liquid through said inlet means, and means responsive to overflow of liquid from the lower end of the lowermost of said jars to cut off further escape of air through said air outlet means to thus limit further admission of liquid into said chamber by said inlet means.

6. In a multi-cell battery, a casing construction comprising wall means defining a chamber and further defining a plurality of battery jars enclosed within said chamber and arranged one above the other with said jars being tipped with respect to the horizontal each oppositely to the jar next adjacent it, a downwardly directed water inlet pipe opening into said closed chamber adjacent the upper end thereof so as to discharge entering water into the uppermost of said jars adjacent the higher end thereof for filling the jar at least to a level with its lower end, means ducting overflow from the lower end of each of said jars to the higher end of the next lower jar, an upwardly directed air outlet pipe opening into said closed chamber adjacent the bottom end thereof for venting air from said chamber on admission of water into said chamber through said inlet conduit, and means ducting overflow liquid from the lower end of the lowermost of said jars to the bottom of said closed chamber whereby accumulation of overflow liquid at the chamber bottom is effective to close off said air outlet pipe to thus limit further admission of liquid into said chamber by said inlet conduit.

7. A battery as defined in claim 6 wherein each of said battery jars contains a plurality of electrode units each comprising a positive and a negative plate electrically interconnected with each other, the positive plate of each electrode unit being conductively connected to the negative plate of the next adjacent electrode unit through the electrolyte therebetween.

8. A battery as defined in claim 6 wherein each of said battery jars is of compressible insulating material and is formed with inwardly opening grooves each receiving the peripheral edge of an electrode unit, said jar being compressed on assembly into said battery casing so as to provide liquid-tight seal between the walls of said grooves and the edges of the electrode units received therein.

9. A deferred action battery comprising casing wall means defining a closed chamber and further defining a battery jar disposed within said chamber, a plurality of substantially vertically disposed battery electrode members having their upper edges arranged in vertically staggered and horizontally spaced relation in said battery jar, inlet means operable when said casing is immersed to admit water into said chamber and into said jar adjacent the uppermost of said battery electrode members, and air exhaust means responsive to overflow from said jar to limit further inflow of liquid through said inlet means into said chamber.

10. In a deferred action battery, a casing construction comprising wall means defining a closed chamber and further defining a battery jar within said chamber, a substantially vertically disposed liquid inlet conduit having its lower end open to the exterior of said chamber adjacent the bottom thereof and its upper end opening into said closed chamber adjacent the top thereof and arranged to discharge entering liquid into said battery jar, and a substantially vertically disposed air outlet conduit having its upper end open to the exterior of said chamber adjacent the top thereof and its lower end opening into said chamber adjacent the bottom thereof, whereby on immersion of said casing in liquid the liquid may enter the casing through said liquid inlet conduit and displace air from the casing through said air outlet conduit until overflow liquid from said jar rises to a level above the chamber bottom such that the liquid closes off said air outlet conduit and thereby limits further admission of liquid into said chamber through said inlet conduit.

References Cited in the file of this patent

UNITED STATES PATENTS

| 604,588 | Lloyd | May 24, 1898 |
| 1,354,800 | Butler | Oct. 5, 1920 |
| 1,381,298 | Gill | June 14, 1921 |
| 2,640,090 | Pucher et al. | May 26, 1953 |

FOREIGN PATENTS

| 8,908 | Great Britain | June 12, 1884 |
| 16,268 | Great Britain | July 22, 1896 |